(12) United States Patent
Moussa et al.

(10) Patent No.: US 9,063,327 B2
(45) Date of Patent: Jun. 23, 2015

(54) ADJUSTABLE HEAD-UP DISPLAY DEVICE

(75) Inventors: Hassan Moussa, Illkirch (FR); Claude Simon, Plobsheim (FR); Alain Guidi, Turckheim (FR)

(73) Assignee: Delphi Technologies, Inc., Troy, MI (US)

( * ) Notice: Subject to any disclaimer, the term of this patent is extended or adjusted under 35 U.S.C. 154(b) by 346 days.

(21) Appl. No.: 13/810,467

(22) PCT Filed: Jul. 4, 2011

(86) PCT No.: PCT/EP2011/061218
§ 371 (c)(1),
(2), (4) Date: Apr. 12, 2013

(87) PCT Pub. No.: WO2012/007305
PCT Pub. Date: Jan. 19, 2012

(65) Prior Publication Data
US 2013/0194518 A1  Aug. 1, 2013

(30) Foreign Application Priority Data

Jul. 16, 2010  (FR) ..................... 10 55779

(51) Int. Cl.
| | |
|---|---|
| G03B 21/14 | (2006.01) |
| G02B 27/14 | (2006.01) |
| G02B 27/01 | (2006.01) |
| G02B 7/182 | (2006.01) |
| G02F 1/13 | (2006.01) |

(52) U.S. Cl.
CPC .............. *G02B 27/01* (2013.01); *G02B 7/1821* (2013.01); *G02B 27/0149* (2013.01); *G02B 27/0101* (2013.01); *G02F 1/1313* (2013.01)

(58) Field of Classification Search
CPC ........... G02B 27/0149; G02B 27/0101; G02B 27/01; G02F 1/1313
USPC ................. 353/13, 119; 359/633, 632, 630; 348/115; 345/7
See application file for complete search history.

(56) References Cited

U.S. PATENT DOCUMENTS

| | | | |
|---|---|---|---|
| 5,237,455 A | 8/1993 | Bordo et al. | |
| 5,504,622 A * | 4/1996 | Oikawa et al. | ................ 359/630 |

(Continued)

FOREIGN PATENT DOCUMENTS

| | | |
|---|---|---|
| EP | 2 093 094 | 8/2009 |
| JP | 10 333080 | 12/1998 |
| JP | 2009 006968 | 1/2009 |

OTHER PUBLICATIONS

International Search Report dated Oct. 25, 2011.

*Primary Examiner* — William C Dowling
*Assistant Examiner* — Magda Cruz
(74) *Attorney, Agent, or Firm* — Lawrence D. Hazelton (57) ABSTRACT

The invention relates to a head-up display device, including a projector for generating a light beam carrying information to be displayed, a combiner having a display position for displaying the information in the field of vision of a user, and an optical system defining an optical path between the projector and the combiner when the latter is in the display position thereof, for directing the light beam onto the combiner. The optical system includes a first and a second deflecting mirror. The first mirror is arranged for receiving the light beam from the projector and for sending said light beam to the second mirror, the latter being arranged for sending the light beam over the optical path toward the combiner. An actuation system is provided for adjusting the length of the optical path between the projector and the combiner by positioning the first and second deflecting mirrors.

13 Claims, 4 Drawing Sheets

(56) References Cited

U.S. PATENT DOCUMENTS

| | | | |
|---|---|---|---|
| 6,504,518 B1* | 1/2003 | Kuwayama et al. | 345/7 |
| 7,280,282 B2* | 10/2007 | Kageyama et al. | 359/632 |
| 2005/0024490 A1* | 2/2005 | Harada et al. | 348/115 |
| 2005/0156815 A1* | 7/2005 | Aoki et al. | 345/7 |
| 2010/0067118 A1 | 3/2010 | Takahashi et al. | |

\* cited by examiner

ADJUSTABLE HEAD-UP DISPLAY DEVICE

CROSS-REFERENCE TO RELATED APPLICATION

This application claims the benefit under 35 U.S.C. §371 of published PCT Patent Application Number PCT/EP 2011/061218, filed Jul. 4, 2011, claiming priority to French Patent Application Number FR1055779 filed on Jul. 16, 2010, and published as WO2012/007305 on Jan. 19, 2012, the entire contents of which is hereby incorporated by reference herein.

TECHNICAL FIELD OF INVENTION

The present invention relates to a head-up display device, in particular for motor vehicles, lorries, buses, trains, aircraft, etc. In particular, the invention relates to a head-up display device with a retractable combiner.

BACKGROUND OF INVENTION

A head-up display device typically includes a projection unit that produces a light beam intended to be directed towards a combiner in order to project images, in particular operating and driving information of a vehicle, in the form of a virtual image, in the field of view of a user, in particular a pilot or motor vehicle driver.

Designed originally for the display of information to pilots of combat aircraft, head-up display devices are increasingly used today in particular in the motor vehicle sector, more particularly in cars of medium and high range. Head-up display devices are reputed to contribute to road safety as they allow drivers to read the information without their eyes leaving the road in front of them. The virtual image containing the displayed information is moreover projected at a distance of a few meters in front of the driver, which allows him to read the information without modification of the accommodation of his eyes.

Head-up display devices exist which use a part of the windscreen as combiner, i.e. as the optical element which combines the light beam containing the information having to be presented to the user with the light coming from the environment. Other head-up display devices include a combiner independent of the windscreen. Such a combiner comprises a strip having the necessary optical properties to deviate at least a substantial part of the beam coming from the projection unit towards the user, while being sufficiently transparent to allow passage at the same time of a substantial part of the ambient light coming from the environment.

It has proved desirable to be able to protect the optical elements of the head-up display device, for example against dust and other detrimental influences, risking deterioration of the projection quality.

Another problem is the adjustment of the head-up display device to the needs of the driver. In particular, because the angle of view (the angle relative to the nominal direction up to which the image can be viewed with sufficient contrast) of a head-up display device is typically fairly small and the position of the eyes of the user can vary greatly from one user to the other, the head-up display device should be provided with means allowing the user to adjust the direction in which the beam carrying the information to be displayed at the height of his eyes is returned.

U.S. Pat. No. 5,394,203 describes a head-up display device comprising a combiner in the form of a reflective strip mounted tilting and acting as a lid that is closed when the device is not in use. However, given that the strip acts as a lid, one of its sides remains exposed to the detrimental influences.

Application WO 2007/057608 presents a head-up display device with a retractable combiner. The combiner is mounted on a movable support so as to be able to be displaced between a display position, in which the combiner is upright facing the driver, and a storage position, in which the combiner is returned back into the case which protects all of the optical and mechanical components of the head-up display device. The limit of travel of the movable support carrying the combiner can be adjusted to obtain adjustment of the angle of slope of the combiner and thus the angle of slope of the axis going from the eyes of the driver to the virtual image.

However, the head-up display device of application WO 2007/057608 does not allow adjustment of the distance at which the virtual image is displayed. Now the adjustment of the projection distance is very advantageous from the ergonomic point of view, as it allows the position of the virtual image to be suited relative to the mechanical architecture of the vehicle (in particular relative to the dimensions of the bonnet). Moreover, this type of adjustment allows the user to suit the display to his viewing conditions.

Document JP 10 333080 discloses a head-up display device with two deflection mirrors in the optical path between the projector and the combiner. The first of the two mirrors from the projector is mounted rotatable or displaceable in translation to be able to change the vertical position of the virtual image in the field of view of the user.

Document US 2005/0024490 describes a head-up display device, in which the last mirror, i.e. the one that is in the field of view of the user is retractable. In its storage position, the mirror forms the lid of the head-up display device. The rear face of this mirror (i.e. the upper face in the storage position) is provided with a foldable cover. This cover is deployed when the mirror is closed to give an appearance of quality to the device. The mirror can be formed as combiner; in this case, the cover is completely retracted when the mirror is in the display position.

Document U.S. Pat. No. 5,237,455 describes a head-up display device with a retractable combiner. The opening through which the combiner can be manually removed from and returned to the case is closable by a curtain. The opening and closing of this curtain is also performed manually.

SUMMARY OF THE INVENTION

A head-up display device comprises a projector to generate a light beam loaded with information to be displayed, a combiner having a display position to display the information in the field of view of a user and an optical system defining an optical path between the projector and the combiner when the latter is in its display position, to direct the light beam at the combiner. In accordance with the invention, the optical system comprises at least a first and a second deviation mirror in the optical path. The first mirror is arranged to receive the light beam from the projector and return it towards the second mirror, the latter being arranged to return the light beam on the optical path towards the combiner. The device also comprises an actuation system configured to adjust the length of the optical path between the projector and the combiner by positioning of the first and second deviation mirrors one relative to the other. By means of the arrangements of the invention, it is possible to adjust the distance at which the virtual image is situated from the combiner (projection distance).

The actuation system preferably comprises a mechanism coupled both to the first and to the second mirror. The mechanism could be manually driven by the user (e.g. by means of an adjustment lever connected to the mechanism). However, for more user comfort, the mechanism is preferably driven by an electric motor (e.g. a servomotor) which the user can control by means of a control button (e.g. on the dashboard).

In accordance with an advantageous embodiment of the invention, the second mirror is coupled to the mechanism so as to be displaceable in translation (preferably perpendicularly to its surface), and the first mirror is coupled to the mechanism to pivot by an angle determined as a function of the displacement of the second mirror. The angle of slope of the first mirror is in particular preferably given by a linear function of the displacement of the second mirror relative to a reference position. By this coupling of the first and second mirrors, it is ensured that the light beam arrives at the combiner whatever the position of the intermediate mirrors. In a way, by means of the first mirror, automatic aiming of the light beam at the second mirror and at the combiner is performed. On adjustment of the projection distance, the virtual image therefore remains substantially on the same axis passing through the eyes of the driver and the combiner.

The projector preferably comprises a spatial light modulator (in English: "spatial light modulator"), e.g. a holographic memory, in which the information to be displayed is stored in the form of holograms, or a backlit liquid crystal display. In this case, the projector advantageously comprises a backlighting light source (e.g. a laser source or one or more luminescent diodes) arranged to send through the liquid crystal display a light beam not yet loaded with the information to be displayed, and in which the liquid crystal display is mounted displaceable transversally to the direction of the light beam. In accordance with a first modification, the light beam can remain immobile when the spatial light modulator is displaced. In accordance with another modification, the projector is configured displaceable in translation in its entirety. It will be noted that the translation of the spatial light modulator transversally to the direction of the beam permits adjustment of the transversal position of the virtual image relative to the axis: eyes of the driver—combiner. The device preferably comprises a control lever mechanically coupled to the spatial light modulator, by means of which the user can adjust the transversal position of the virtual image. Alternatively, the spatial light modulator is displaceable by means of an electric motor (e.g. a servomotor) which the user can control by means of a button or a control knob. The button or the knob in this case transmit the adjustment instructions to the head-up display (e.g. via the communication network of the vehicle), which translates them into a mechanical movement. A modification of the invention in accordance with which the user can control the projection distance and the transversal position by a same button or control knob is considered as particularly ergonomic.

The combiner can be formed as a semi-reflective mirror (flat or curved) or diffractive combiner (i.e. a combiner that deviates the light towards the user by means of an optical diffraction grating, optionally integrating an enlargement of the virtual image and/or a luminance level control.) The combiner is advantageously made of a plastics material.

In accordance with a very advantageous embodiment of the invention, the combiner is formed as a retractable combiner having a storage position in addition to its display position. The combiner is then preferably connected to an articulated mechanism configured to displace the combiner between the display position and the storage position.

In accordance with this embodiment of the invention, the head-up display device preferably comprises a case in which are arranged the projector, the optical system and the combiner, the case being provided with a first opening, through which the combiner can pass on its displacement between the storage and display positions, and a second opening, through which the light beam can pass from the optical system towards the combiner.

Preferably, the case also comprises a closure curtain to close the first opening when the combiner is in its storage position.

It will be appreciated that the movement which the combiner performs on its passage from the storage position to the display position can be so designed that the combiner and/or the mechanism to which the combiner is connected forces (e.g. by pushing) the curtain out of the path of the combiner to open the passage through the first opening.

The case preferably comprises a trapdoor closing the second opening when the combiner is in its storage position. Still more advantageously, the trapdoor is provided with a housing space to receive the curtain when this is forced out of the path of the combiner.

The opening and closing mechanism of the trapdoor is advantageously coupled to the mechanism intended to displace the combiner between the display position and the storage position.

The head-up display device preferably comprises a return means, e.g. a return spring, arranged to accumulate mechanical energy when the curtain is forced out of the path of the combiner and to use this energy to return the curtain into a closure position of the first opening when the combiner passes from its display position to its storage position.

The man skilled in the art will note that the system for retraction of the combiner and/or closure of the trapdoor can be formed independently of the system for adjustment of the projection distance described above. However, these two aspects of the invention are combined in particularly advantageous manner in the embodiment described by way of illustration below.

BRIEF DESCRIPTION OF DRAWINGS

Other features and characteristics of the invention will become apparent from the detailed description of an advantageous embodiment presented below, by way of illustration, with reference to the attached drawings. These show.

DETAILED DESCRIPTION

Figure 1:
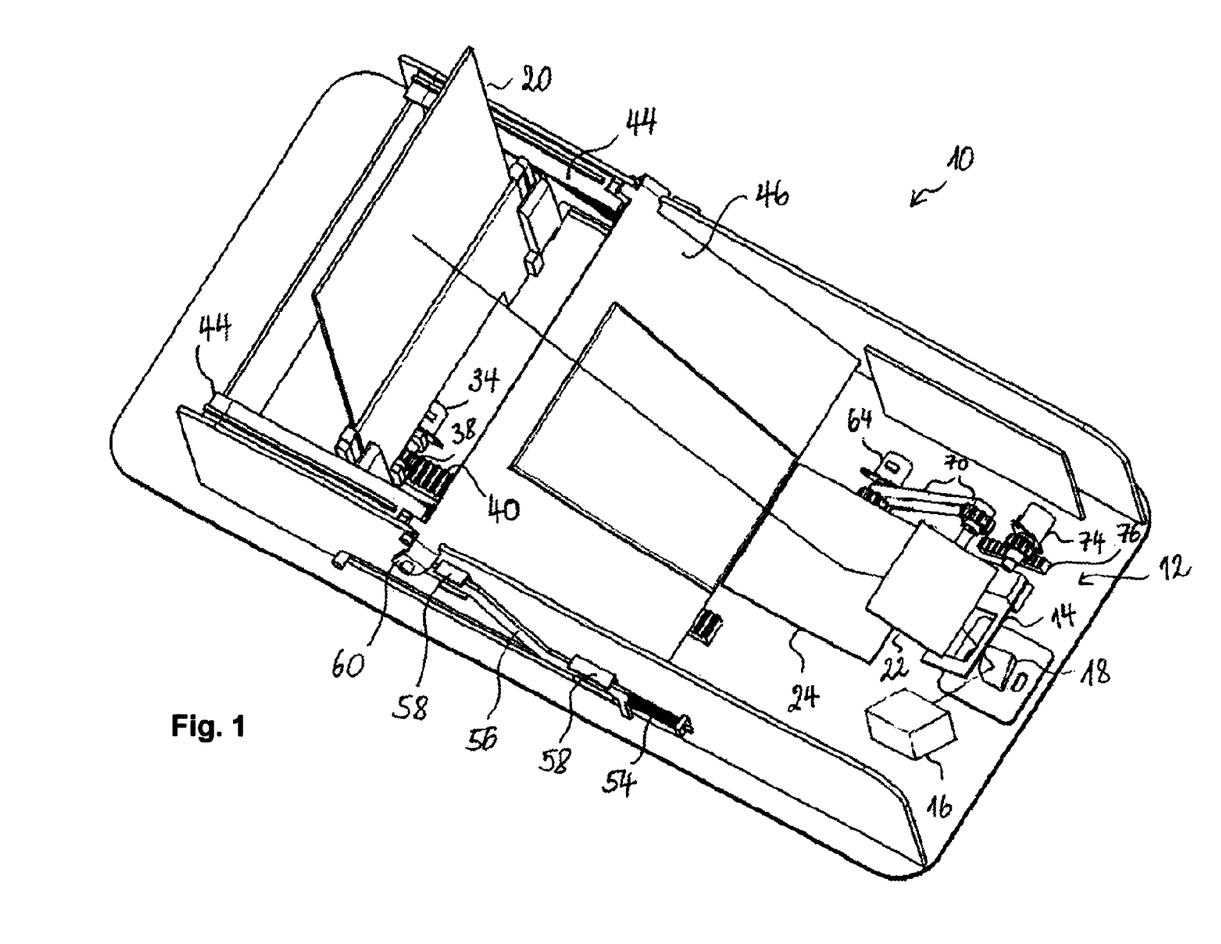
FIG. 1: a partial three-dimensional view of a head-up display device in accordance with a preferred embodiment of the invention.

FIG. 1 shows a perspective view of a head-up display device 10 for a motor vehicle, in accordance with a preferred embodiment of the invention. The device 10 comprises a system for retraction of the combiner, described in more detail with reference to FIGS. 2 to 5, as well as a system for adjustment of the position of the virtual image, described in more detail below with reference to FIGS. 6 and 7.

The device 10 firstly comprises a projector 12 to generate the light beam loaded with the image representing the information to be displayed to the driver of the vehicle. The projector 12 includes a liquid crystal display 14, a light source 16 (coherent or non-coherent, depending on the type of the combiner, which can be diffractive or reflective producing a backlighting light beam and a mirror 18 returning the backlighting beam coming from the source 16 through the liquid crystal display 14. The liquid crystal display functions as a spatial light modulator and produces the image that will be displayed to the driver. The optical path between the projector 12 and the display position of the combiner 20 is defined by an optical system. This comprises a first deviation mirror 22 and a second deviation mirror 24. The first mirror 22 is arranged to receive the light beam from the projector 12 and return it towards the second mirror 24, which is arranged to return the light beam to the combiner 20, when this is in its display position (shown in FIG. 1).

The combiner 20 is retractable by means of a retraction system shown in more detail in FIGS. 2 to 5. In addition to its display position, the combiner 20 has a storage position essentially flattened inside the case 25 of the head-up display device 10. The combiner 20 is fixed to an articulated mechanism which displaces it between the display and storage positions. More precisely, the articulated mechanism comprises, on either side of the combiner 20, a first connecting rod 26 and a second connecting rod 28 which are joined by an articulation 30 at one of their ends. The other end of the first connecting rod 26 is housed movable in rotation on a first bearing 32 displaceable in translation by an electric motor 34, while the other end of the second connecting rod 28 is housed movable in rotation on a second bearing 36 fixed relative to the case 25. The combiner 20 is attached to the first connecting rod 26. To bring the combiner from its storage position (shown in FIG. 2) to its display position, the motor 34 turns a pinion 38, which drives the displacement of the first bearing 32 on a rack 40 and therefore the shortening of the base of the triangle the vertices of which are formed by the bearings 32 and 36 and by the articulation 30. As a result the combiner 20 rises progressively as the first and second bearings 32, 36 approach each other. When the combiner 20 is completely upright, the motor 34 stops and locks the articulated mechanism in the bent position. Preferably, the limit of travel of the pinion 38 on the rack 40 is adjustable by the driver, who can thus adjust the slope of the combiner 20 in the display position.

Figure 2:
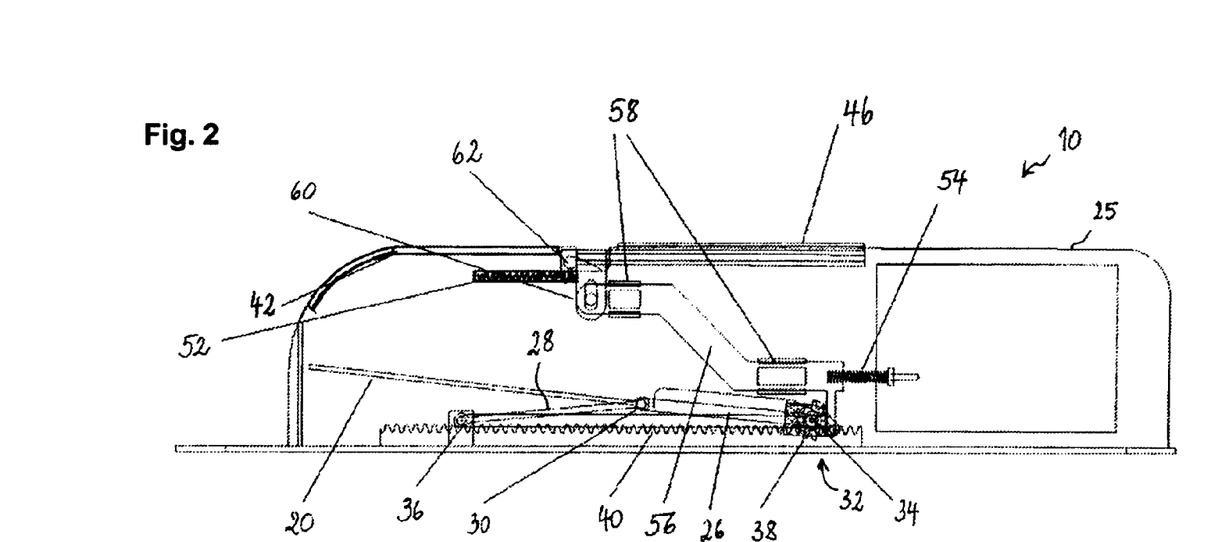
FIG. 2: a longitudinal section of the system for retraction of the combiner of the device of FIG. 1, with the combiner in its storage position.
Figure 3:
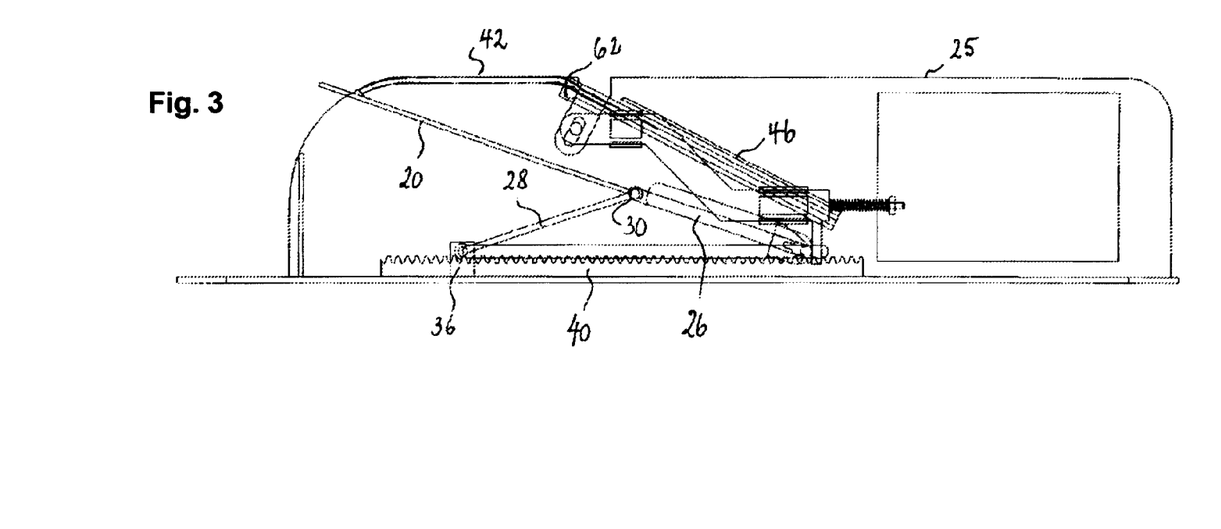
FIG. 3: a longitudinal section of the system of FIG. 2, the combiner being between its storage position and its display position.

The case 25 of the device 10 comprises a first opening, through which the combiner 20 passes on its displacement between the storage and display positions, and of a second opening, through which the light beam passes from the optical system towards the display position of the combiner 20. A closure curtain 42 is provided to close the first opening and protect the combiner 20 against dust when the combiner 20 is in its storage position.

Figure 4:
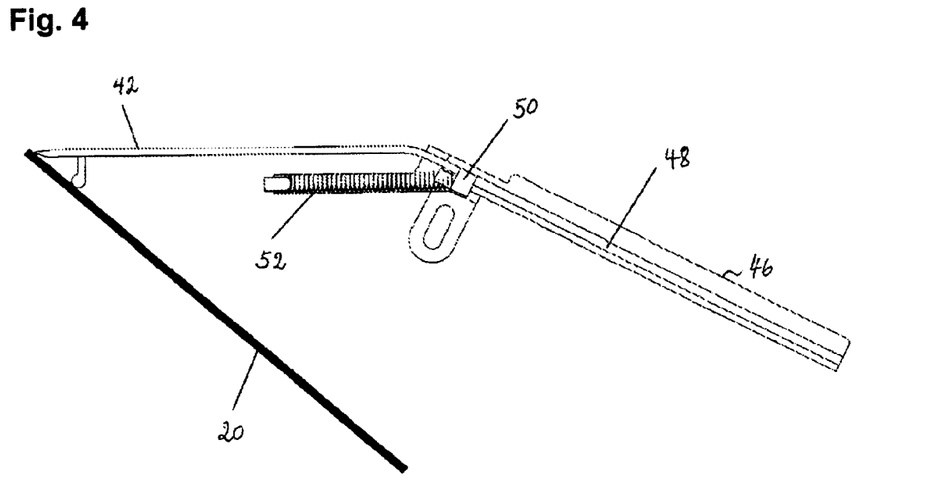
FIG. 4: a partial view of the system for opening and closing the curtain protecting the combiner in its storage position.
Figure 5:
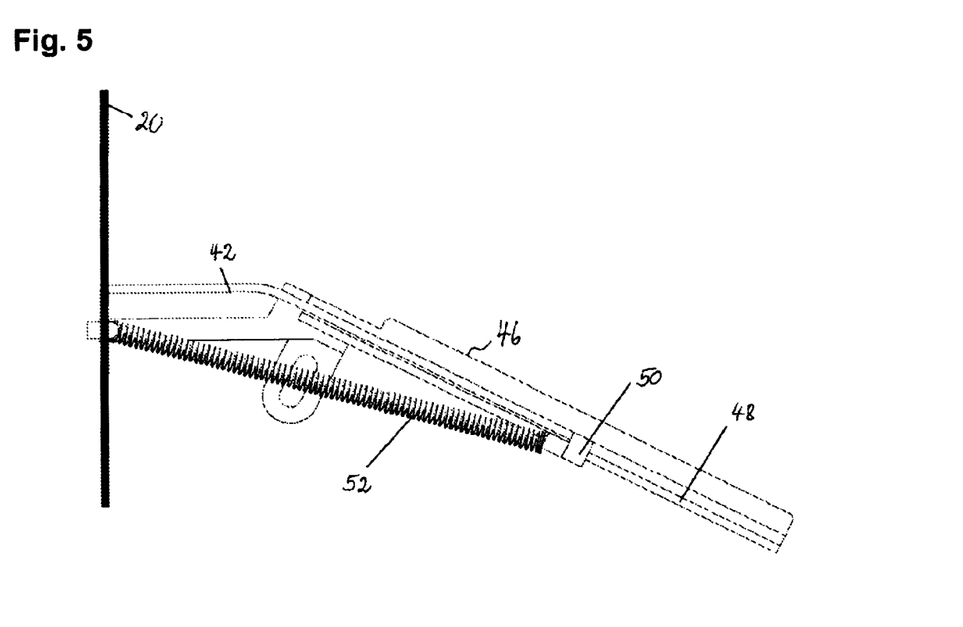
FIG. 5: a partial view of the system of FIG. 4, with the combiner in its display position.

As shown in FIGS. 4 and 5, the movement performed by the combiner 20 on its passage from the storage position to the display position is so designed that the combiner pushes the curtain 42 out of its path to open the passage through the first opening. When the combiner 20 pushes back the curtain 42, this is displaced in slideways 44 provided on the side walls of the case 25 (see FIG. 1) and on the trapdoor 46 provided to close the second opening when the combiner is in its storage position. On the lower side of the trapdoor 46, the grooves 48 define a housing receiving the curtain 42 when this is displaced out of the path of the combiner 20. When the curtain 42 is displaced by the combiner 20, it pushes against a fixing piece 50, fixed to a return spring 52 that stretches and accumulates mechanical energy. In the display position of the combiner, the curtain 42 remains in abutment against the combiner 20. The mechanical energy accumulated in the return spring 52 is used to return the curtain 42 into the closure position of the first opening when the motor 34 operates in the opposite direction and the combiner 20 passes from its display position to its storage position To open and close the trapdoor 46, the head-up display device comprises a trapdoor opening and closing mechanism coupled to the mechanism intended to displace the combiner 20 between the display position and the storage position. The mechanism for opening and closing the trapdoor comprises a spring 54, a driving element 56, slideways 58 and a pivoting element 60 attached to the trapdoor 46. When the combiner 20 is in its storage position, the motor 34 and the bearing 32 abut against the driving element which is at its limit of travel and holds the trapdoor 46 closed by means of the pivoting element 60. In this position, the spring 54 is compressed. When the motor 34 and the bearing 32 are displaced in the direction of the second bearing 36 following a command for turning on the head-up display device 10, the spring 54 is decompressed and displaces the driving element 56 in the slideways 58. This displacement turns the pivoting element 60 about its axis 62 and the trapdoor passes into the open position, thus permitting the passage of the light beam coming from the projector 12.

Figure 6:
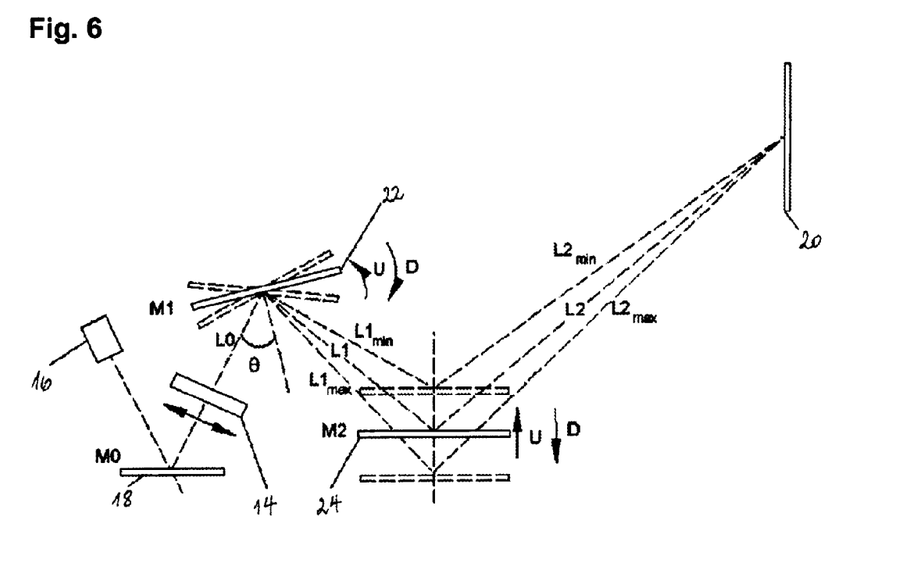
FIG. 6: a basic diagram of the system for adjustment of the position of the virtual image.
Figure 7:
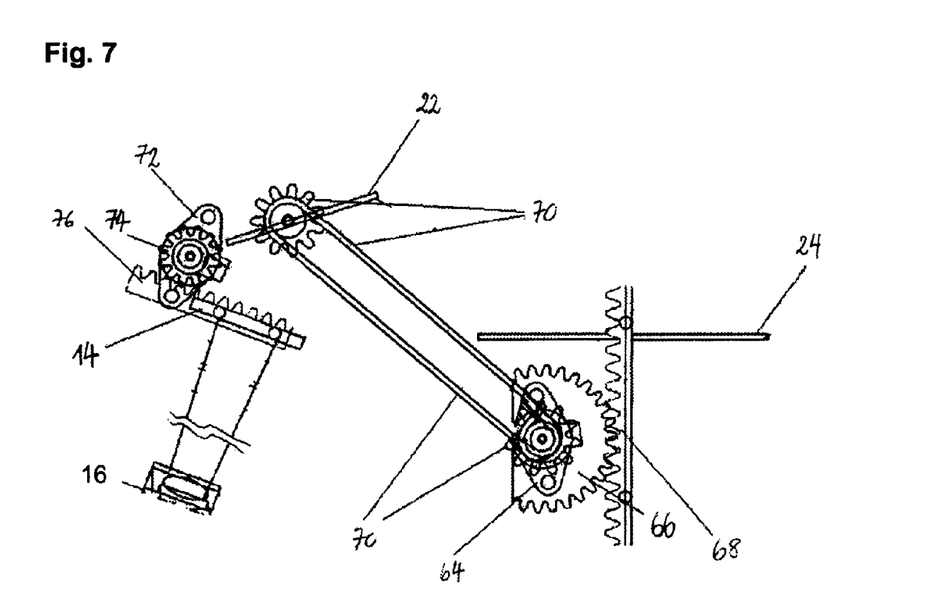
FIG. 7: a partial view of the mechanism of FIG. 6.

The head-up display device 10 also includes a system for adjustment of the position of the virtual image (FIGS. 6 and 7). The projection distance of the virtual image is adjustable by means of a system for actuation of the deviation mirrors 22 and 24. The vertical position of the virtual image can moreover be adjusted by a system for translation of the liquid crystal display 14.

The principal of the adjustment of the projection distance around a nominal distance is explained with reference to FIG. 6. The image comprising the information to be displayed is generated by the projector 12. The length p of the optical path between the projector and the combiner (in the display position) is given by $$p = L0 + L1 + L2 \qquad \text{Eq. 1,}$$

in which L0 designates the distance between the projector and the mirror 22 (also M1 in FIG. 6), L1 the distance between the mirror 22 and the mirror 24 (also M2), and L2 the distance between the mirror 24 and the combiner 20.

The distance of the virtual image from the combiner $D_{iv}$ can be approximated with sufficient accuracy by the product of the length of the optical path between the projector and the combiner p and the enlargement factor g of the combiner (Eq. 2).

$$D_{iv} = p \cdot g \qquad \text{Eq. 2.}$$

To adjust the projection distance, the length of the optical path between the projector 12 and the combiner 20 can therefore be adjusted. In the device 10, the length of the optical path p is adjusted by positioning of the first and second deviation mirrors 22 and 24 one relative to the other.

Two cases can be distinguished. When it is required to reduce the projection distance (relative to the nominal projection distance), the mirror 24 is displaced upwardly in FIG. 6 (perpendicularly to its surface) and the mirror 22 is simultaneously turned anticlockwise. When it is required to increase the projection distance (relative to the nominal projection distance) the mirror 24 is displaced downwardly in FIG. 6 (perpendicularly to its surface) and the mirror 22 is simultaneously turned clockwise.

In this way, the projection distance can be varied between a minimum value $D_{iv\_min}$ and a maximum value $D_{iv\_max}$, defined respectively by Eq. 3 and Eq. 4

$$D_{iv\_min}=g\cdot(L0+L1_{min}+L2_{min}) \text{ and} \qquad \text{Eq. 3}$$

$$D_{iv\_min}=g\cdot(L0+L1_{max}+L2_{max}) \qquad \text{Eq. 4.}$$

The extreme positions of the mirrors 22 and 24 are shown by broken lines in FIG. 6.

The mirrors 22 and 24 are positioned by means of a mechanism coupled both to the first and to the second mirror (see FIG. 7). The mechanism is driven by an electric motor 64 which the user can control by means of a control button (e.g. on the dashboard).

The second mirror 24 is coupled to the mechanism so as to be displaceable in translation perpendicularly to its reflective surface. The first mirror 22 is coupled to the mechanism to pivot by an angle θ determined as a function of the displacement of the second mirror 24. As shown in FIG. 7, the mirror 24 is fixed on a movable support which can slide perpendicularly to the reflective surface of the mirror 24. The mirror 24 is positioned by means of an electric motor 64 that drives a pinion 66 meshing in a rack 68 fixed on the movable support carrying the mirror 24. When the motor 64 turns, it causes the simultaneous turning of the first mirror 22, by means of a gear and belt mechanism 70. The transmission ratios between the motor 64 and the second mirror 22, on the one hand, and between the motor 64 and the mirror 22, on the other, are so selected that automatic aiming is effected of the light beam at the second mirror 24 and at the combiner 20 and it is therefore ensured that the light beam arrives substantially at the same place on the combiner 20 whatever the position of the intermediate mirrors 22 and 24. On adjustment of the projection distance, the driver does not therefore see the virtual image to be displaced vertically or laterally.

To position the virtual image vertically, the liquid crystal display 14 can be displaced transversally relative to the direction of the backlighting light beam coming from the light source 16. (FIG. 7 does not show the deviation mirror 18 between the light source 16 and the liquid crystal display 14.) The displacement of the liquid crystal display 14 is effected by means of an electric motor 72, which drives a pinion 74, and rack 76 system. As the displacement of the liquid crystal display 14 is in a plane perpendicular to the light beam, there is no notable resulting variation in the projection distance of the virtual image.

The driver can therefore adjust the projection distance and the vertical position of the virtual image independently.

To control the different electric motors (which can be servomotors), the head-up display device 10 comprises a control unit (not shown in the figures) having one or more interfaces for interaction with the user (e.g. control buttons). In the example shown in the figures, the user can in particular adjust the slope of the combiner (determined by the limit of travel of the pinion 38 on the rack 40), which allows him to adjust the display to his height (or, more precisely, the height of his eyes); The projection distance (determined by the position of the mirrors 22 and 24); and the vertical position of the virtual image (determined by the position of the liquid crystal display 14).

It will be appreciated that the head-up display device 10 is in a compact, easily integrated form, while offering the facility of adjustment to the individual needs of the user.

While this invention has been described in terms of the preferred embodiments thereof, it is not intended to be so limited, but rather only to the extent set forth in the claims that follow.

Key:
10 head-up display device
12 projector
14 liquid-crystal display
16 light source
18 mirror
20 combiner
22 first deviation mirror
24 second deviation mirror
25 case
26 first connecting rod
28 second connecting rod
30 articulation
32 first bearing
34 electric motor
36 second bearing
38 pinion
40 rack
42 closure curtain
44 slideway
46 trapdoor
48 groove
50 fixing piece
52 return spring
54 spring
56 driving element
58 slideway
60 pivoting element
62 pivoting axis
64 electric motor
66 pinion
68 rack

The invention claimed is:

1. A head-up display device, comprising:
a projector to generate a light beam conveying information to be displayed;
a combiner having a display position to display the information in the field of view of a user;
an optical system defining an optical path between the projector and the combiner when the combiner is in the display position, said optical system configured to direct the light beam at the combiner, wherein the optical system comprises at least a first deviation mirror and a second deviation mirror in the optical path, the first deviation mirror being arranged to receive the light beam from the projector and return it towards the second deviation mirror, the second deviation mirror being arranged to return the light beam on the optical path towards the combiner; and
an actuation system configured to adjust the length of the optical path between the projector and the combiner by positioning of the first and second deviation mirrors the one relative to the other, wherein the actuation system comprises a mechanism coupled to the first deviation mirror and the second deviation mirror, and driven by a motor.

2. The device as described in claim 1, wherein the second deviation mirror is coupled to the mechanism so as to be displaceable in translation, the first deviation mirror being coupled to the mechanism to pivot by an angle determined as a function of the displacement of the second mirror.

3. The device as described in claim 1, wherein the projector comprises a backlit liquid-crystal display.

4. The device as described in claim 1, wherein the projector comprises a backlighting light source arranged to send through the liquid crystal display a light beam not yet conveying the information to be displayed, and wherein the liquid crystal display is mounted displaceable transversally to the direction of the light beam.

5. The device as described in claim 1, wherein the combiner is a semi-reflective mirror or a diffractive combiner.

6. The device as described in claim 1, wherein the combiner is formed as a retractable combiner having a storage position in addition to its display position.

7. The device as described in claim 6, wherein the combiner is connected to an articulated mechanism configured to displace the combiner between the display position and the storage position.

8. The device as described in claim 6 comprising a case in which are arranged the projector, the optical system and the combiner, the case comprising a first opening, through which the combiner can pass on its displacement between the storage and display positions, and a second opening, through which the light beam can pass from the optical system towards the combiner.

9. The device as described in claim 8, wherein the case comprises a closure curtain to close the first opening when the combiner is in its storage position.

10. The device as described in claim 9, wherein the movement performed by the combiner on its passage from the storage position to the display position is so designed that the combiner or the mechanism to which the combiner is connected forces the curtain out of the path of the combiner to open the passage through the first opening.

11. The device as described in claim 10, in which the case comprises a trapdoor to close the second opening when the combiner is in its storage position, the trapdoor comprising a housing to receive the curtain when the latter is forced out of the path of the combiner.

12. The device as described in claim 11, comprising a mechanism for opening and closing of the trapdoor which is coupled to the mechanism intended to displace the combiner between the display position and the storage position.

13. The device as described in claim 10, comprising a return means arranged to accumulate mechanical energy when the curtain is forced out of the path of the combiner and to return the curtain into a closure position of the first opening when the combiner passes from its display position to its storage position.

* * * * *